United States Patent [19]

Kincheloe et al.

[11] 4,372,503

[45] Feb. 8, 1983

[54] FLEXIBLE TAPE CONTROL APPARATUS

[75] Inventors: David W. Kincheloe, West Chicago; David O. Neathery, St. Charles, both of Ill.

[73] Assignee: King Instrument Corporation, Westboro, Mass.

[21] Appl. No.: 199,924

[22] Filed: Oct. 23, 1980

[51] Int. Cl.³ .............................................. G11B 15/06
[52] U.S. Cl. .................................. 242/183; 242/56 R
[58] Field of Search ........................ 242/182, 183–186, 242/75, 75.3, 75.5, 56 R, 67.3; 360/71, 73; 156/504, 506; 226/7, 97, 195; 318/6, 7

[56] References Cited

U.S. PATENT DOCUMENTS

| | | | |
|---|---|---|---|
| 3,648,134 | 3/1972 | Audeh et al. | 318/6 |
| 3,890,641 | 6/1975 | Mo et al. | 360/71 |
| 3,940,080 | 2/1976 | Bennett | 242/56 R |

Primary Examiner—Leonard D. Christian
Attorney, Agent, or Firm—Schiller & Pandiscio

[57] ABSTRACT

A system for loading a predetermined length of magnetic tape paid out from a supply spool into a tape cassette in which the tension of the tape portion being paid out from the supply spool is at a different tension than the tension of the tape portion being taken up into the cassette. A pair of vacuum column tension members provide different tensions at the supply spool and at the take up spool, and a driving member interposes the two vacuum tension members for regulating tape movement between the same. During cassette loading, the take-up spool of the cassette is driven according to a driving signal which varies the movement of the tape at greatly varying speeds while the supply spool and interposing driving member are driven by signals formulated responsive to monitoring the length of the tape at the separate tension members.

14 Claims, 3 Drawing Figures

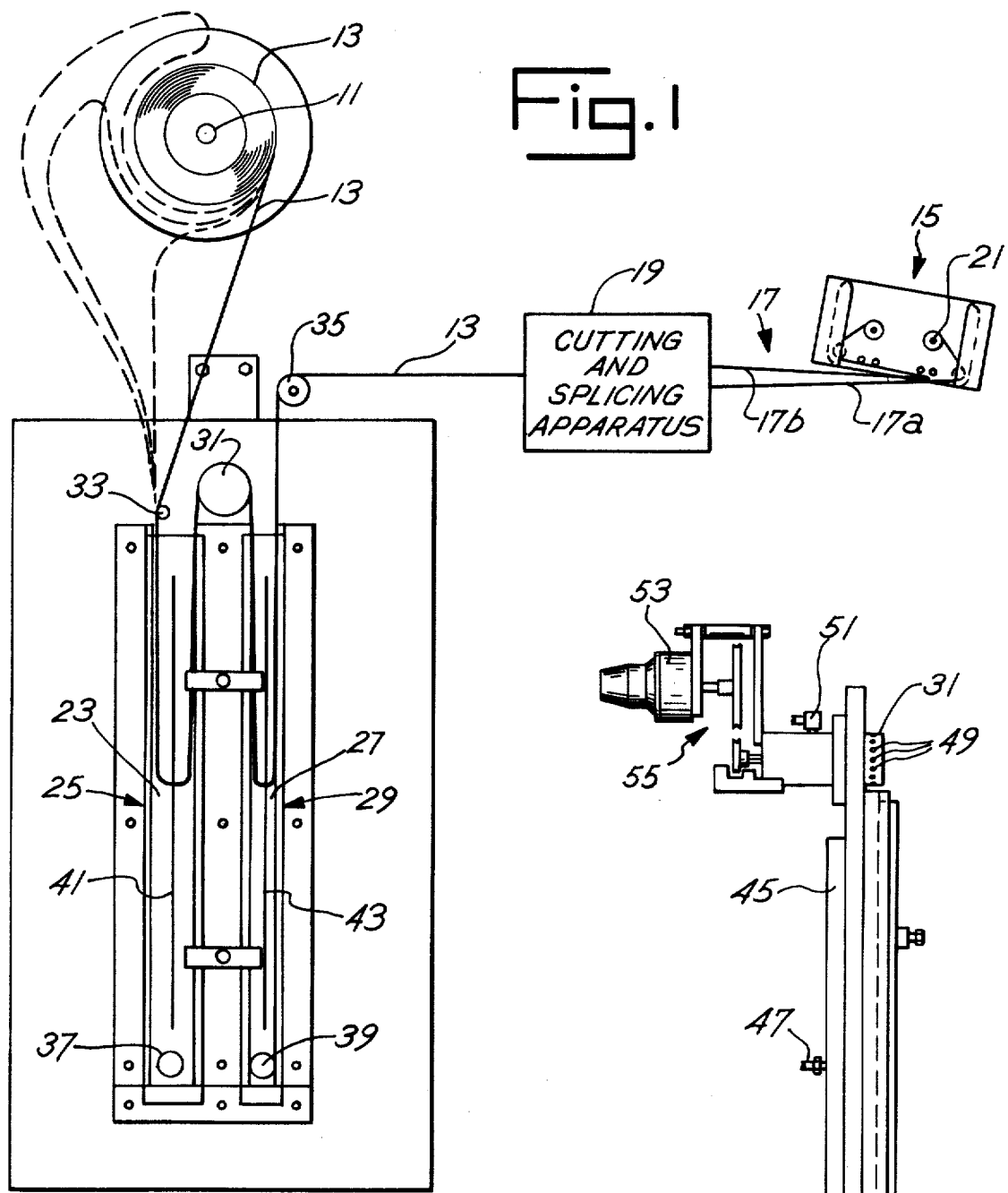

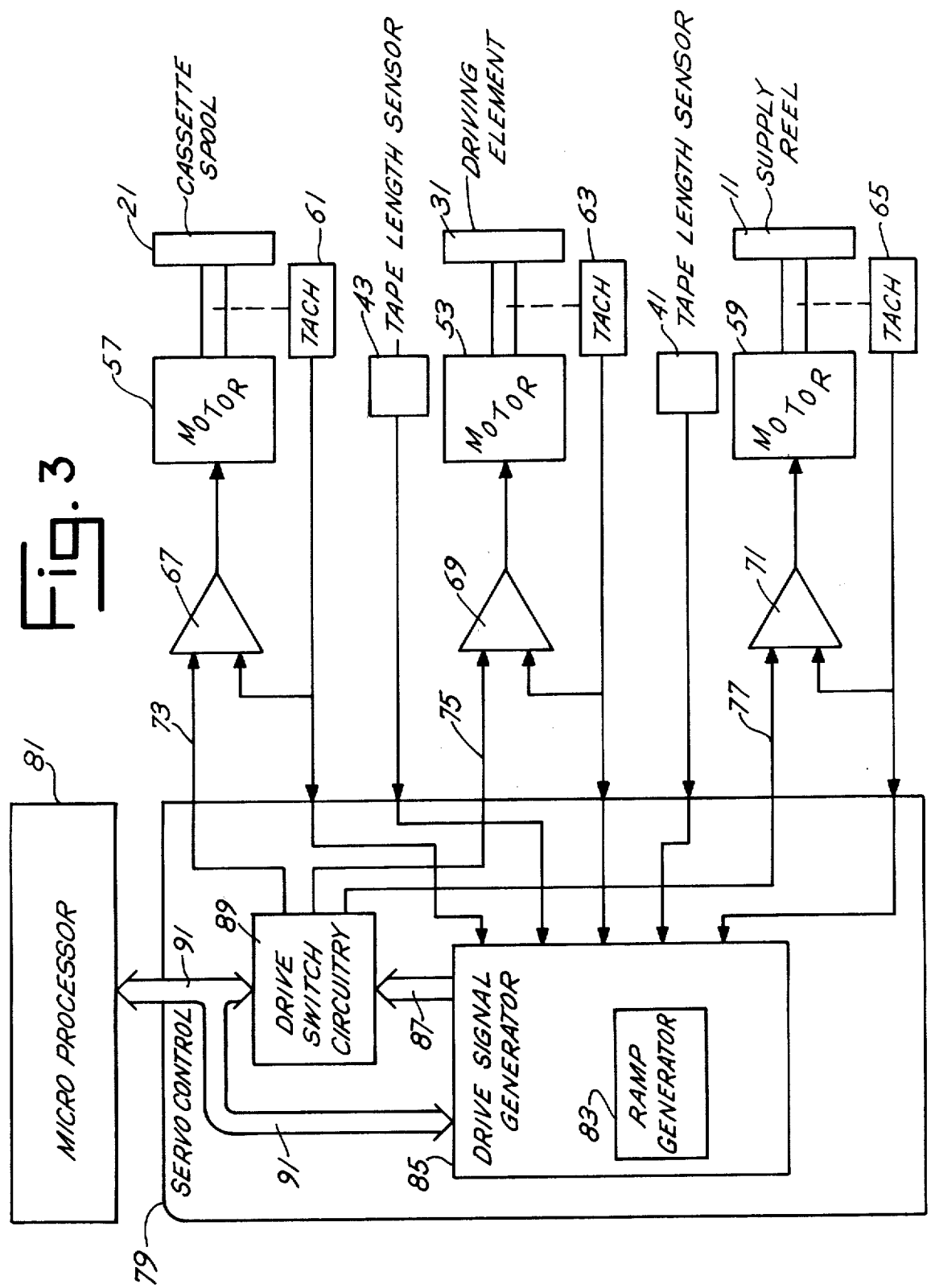

FLEXIBLE TAPE CONTROL APPARATUS

BACKGROUND OF THE INVENTION

The invention relates to a system for providing two different controlled tensions to a flexible tape moving between a first and second hub at a greatly varying rate of speed, and more particularly, relates to a tension control apparatus system for loading magnetic recording tape into tape cassettes.

In a tape cassette loader, a predetermined length of tape is paid out from a spool and taken up and loaded within a tape cassette. Such cassette loaders include a single source of tension regulating the tension between the supply spool and the spool of the tape cassette. See for example U.S. Pat. No. 3,753,834 issued to James L. King on Aug. 21, 1973.

In the art of tape cassette loading, the speed at which a cassette may be loaded with tape determines the quantity of cassettes produceable per machine in a given work day. To produce more cassettes, more machines would be necessary resulting in higher costs for machines, labor in operating the machines, maintenance and energy needs. It would be highly desirable to increase the speed at which the present state of the art machine can load tape into a single cassette.

However, as the cassette spool within the cassette is driven at extremely high rates of speed in order to wind tape extremely fast into the cassette, the tape bearing surfaces inside the cassette begin to heat up from frictional drag of the tape and of the spool of tape building up within the cassette. For example, the slip sheet within the cassette may be abraided through to the cassette shell by contact with the tape, and the shell may begin to melt. Also, rollers and tape guide surfaces within the cassette will heat up and begin to melt during high speed winding. These heating and abraiding effects depend on the speed of winding and the tension of the tape.

Therefore, it would be highly desirable to provide apparatus which permits high speed loading of magnetic tape into a conventional tape cassette. The present invention provides such high speed loading by controlling the tension applied to the tape during loading in order to reduce the rate of heat transfer to the cassette and to reduce abraiding effects to the cassette.

SUMMARY OF THE INVENTION

These and other objects of the invention are achieved by providing the portion of the tape being taken up into the cassette at a very low tension level, and simultaneously providing a higher tension level to the portion of the tape being paid out from the supply reel in order to pay out properly the tape being loaded into the cassette.

In one embodiment, a first tension causing member supplies a first level of tension to the tape being paid out from the supply hub and a second tension causing member applies a second level of tension to the tape being loaded into the cassette. Movement of the tape is controlled to and between the first and second tension causing members in accordance with the lengths of tape contained by the tension members in order to maintain their respective tensions on the flexible tape.

BRIEF DESCRIPTION OF THE DRAWINGS

FIG. 1 is a front view showing a pair of vacuum column tension regulators of a preferred embodiment of a tape control system.

FIG. 2 is a partial side view of the embodiment of FIG. 1.

FIG. 3 is an electrical schematic and block diagram of the control circuitry of the embodiment of the system of FIG. 1.

DESCRIPTION OF THE PREFERRED EMBODIMENT

Referring to FIG. 1, pertinent portions of a tape cassette loader are illustrated in describing the preferred embodiment of the present invention. A tape cassette loader is a machine well known in the art in which an empty cassette is loaded with a predetermined length of magnetic recording tape. Such tape cassette loaders operate automatically by successive presentation of individual tape cassettes as a tape loading position and wherein the machine automatically loads a predetermined length of magnetic recording tape into the cassette, performing a cutting and splicing operation to load each cassette. Reference is made to U.S. patent application Ser. No. 150,595, filed May 16, 1980 in the names of the inventors of this application, which provides background information as to the cutting and splicing operation utilized to load magnetic tape into a tape cassette.

Referring to FIGS. 1 and 2, a tape spool 11 of a cassette loader carries a supply of flexible magnetic recording tape 13 of which a predetermined length is to be cut, spliced and loaded into an empty tape cassette 15. The empty cassette will include a continuous, short length, tape leader 17 having a front portion 17a and a rear portion 17b, between which the length of magnetic tape 13 will be spliced. Cutting and splicing apparatus of the cassette loader, generally indicated by block 19, operates to pull the leader from the cassette in preparation for performing the cutting and splicing operation. The cutting and splicing apparatus is not illustrated in detail since such apparatus forms no part of the present invention.

Tape 13 is spliced to the front leader portion 17a and then wound onto one cassette spool 21 of cassette 15. The tape moves freely through cutting and splicing apparatus 19 during cassette loading until a predetermined length of tape is loaded into the cassette. The tape is then cut and spliced onto the rear leader portion 17b, and then wound into the cassette. Cassette 15 is then ejected and a next empty cassette is moved into position for loading.

Tape 13 is looped within a first vacuum column 23 of a tension regulator 25 and looped within a second vacuum column 27 of a tension regulator 29 prior to being loaded into cassette 15 from spool 11. A driving roller 31 moves the tape between the regulators and a pair of guide rollers 33, 35 are utilized along the tape path to direct the tape from supply spool 11 into and out of vacuum columns 23, 27. For a more specific description of the vacuum columns reference is made to a copending application, Ser. No. 195,345, filed in the name of the same inventors as this application and filed on the same date as this application.

Regulators 25, 29 provide different levels of tension to the tape along its path of movement. Regulator 25 provides a first level of tension to the portion of the tape moving between roller 33 and spool 11 for permitting adequate payout of the tape from spool 11. As spool 11 is turned at extremely high rates of speed the tension level on the tape must be great enough to overcome certain forces acting on the tape. If sufficient tension is not provided, the tape will appear to "stick" to the reel and form a path which, with increasing spool speeds, wraps around the supply spool in a manner shown by the dotted lines of FIG. 1.

The forces which act on tape 13 at the supply spool include an electrostatic force which causes the tape to adhere to itself as the tape is paid out from the spool. Also, an aerodynamic force exists as a film air forms around the tape as the tape is paid out from the spool. These two forces primarily affect the tape, requiring a certain magnitude of tension to be applied at the spool side of the tape in order to properly pay out the tape from the spool as the spool is turned at a very high rate of speed.

However, this tension level at the spool side of the tape is too great a tension level to be applied at the cassette side of the tape when the tape is being loaded at an extremely high rate of speed. As discussed above, the frictional forces within the cassette cause the cassette to heat up and be abraided when the tape is moved at high rates of speed. However, by lowering the tension of the tape, the effect of the frictional and abraiding forces are lowered. Thus, the tension level at the cassette side of the tape is held at a level lower than the tension applied to the spool side of the tape.

Air is drawn from columns 23, 27 via vacuum ports 37, 39 disposed at the bottom of the columns, so that tape 13 is pulled down into each of the columns while being maintained at different predetermined tensions within the two columns. As one end of tape 13 is pulled out of a column, the tape loop in the column will be pulled upwards out of the column since the tension remains constant on the tape. In order to prevent the tape from leaving the column, the other side of the tape is fed into the column in accordance with the extent of tape being pulled from the column. Thus, the amount of tape contained within or, in other terms, the position of the loop within the column is controlled.

In order to monitor the position of the tape loop within respective columns 23, 27, a pair of tape length sensors 41, 43 are utilized to monitor tape length. As illustrated in FIG. 1, each of the tape length sensors 41, 43 includes a slit running the substantial length of respective columns 23, 27 which, as illustrated in FIG. 2, are enclosed on the back side of the columns by a small encased housing 45 forming a small cavity. A pressure sensor 47 (FIG. 2) for each column is located at the back side of its respective housing 45 for monitoring the pressure within the cavity of housing 45. Sensor 47 may tap into housing 45 in a number of locations, rather than one location as shown in FIG. 2, by means of vacuum tubing connecting the tapped locations with sensor 47.

As the tape loop moves up and down within the vacuum column, the pressure monitored by sensor 47 will vary in accordance with the length of the loop within the column. That is, atmospheric pressure will rest on the top of the tape loop and vacuum pressure will rest underneath the tape loop within the vacuum column and thus affect the pressure in housing 45 via the slits, in accordance with the position of the loop within the column. Similarly, photoelectric monitoring of tape length may be utilized, as will suggest itself to persons skilled in the art.

As shown in FIG. 2, driving roller 31 includes a plurality of vacuum apertures 49 formed in the tape confronting face of roller 31 therefor holding the tape onto the roller for aiding in the movement of the tape between columns 23, 27. A motor 53 turns driving roller 31 via a pulley system, generally indicated by reference numeral 55.

Referring to FIG. 3, the three driving elements are shown: cassette spool 21 for winding tape into cassette 15, driving element 31 for moving tape from vacuum column 23 to vacuum column 27, and supply reel 11 for paying out tape into vacuum column 23. The three elements 21, 31, 11 are driven by conventional servo motors 57, 53, 59, respectively. Each of the motors is connected to a conventional tachometer 61, 63, 65, each of which serves as a DC generator for producing a DC level signal indicative of the speed of its respective motor as shown. Each DC signal is fed back to a conventional servo control amplifier 67, 69, 71 which drive a respective motor. Each servo control amplifier compares its respective tachometer signal with a respective driving input signal fed along respective conductors 73, 75, 77, for controlling the speed of its respective motor. The use of a servo control amplifier for controlling the driving speed of a motor in accordance with an input signal is well known within the art.

The driving input signals fed along conductors 73, 75, 77 are formulated by a servo control circuit 79 under command of a microprocessor 81. Reference is made to U.S. patent application Ser. No. 199,923, filed on even date herewith in the name of David O. Neathery and Edward J. Riggs, which describes in detail circuitry configurations which may be utilized within circuit 79.

During winding of tape into cassette 15, the signal fed along conductor 73 is a ramp waveform signal generated by a conventional ramp generator 83 so as to ramp the cassette spool to a predetermined speed for winding tape into the cassette, and thereafter so as to ramp down the speed of cassette spool 21 toward a stopped position. As motor 57 takes up tape into cassette 15, the tape is pulled from column 27 and is monitored by its respective tape length sensor 43. Tape length sensor 43 generates an output signal which is utilized by a drive signal generator 85 which formulates a drive signal to be fed along conductor 75. As tape is pulled from column 27, the signal on line 75 is increased to command driving element 31 to pour more tape into column 27. The signal generated along conductor 75 is formulated by drive signal generator 85 as a function of the DC signal from tape length sensor 43.

Similarly, tape length sensor 41 generates a signal which is utilized by drive signal generator 85 to formulate the drive signal generated along conductor 77. As tape is fed into vacuum column 27, and correspondingly pulled from vacuum column 23, the signal on line 77 must be increased for driving supply spool 11 to pour more tape into vacuum column 23. Thus, the signal generated along conductor 77 is formulated by drive signal generator 85 as a function of the DC signal from tape length sensor 41.

Drive signal generator 85 may generate a plurality of driving signals along a bus 87 for selection by microprocessor 81 as inputs to the servo control amplifiers. A drive switch circuitry 89 receives the plurality of drive signals from bus 87 and is responsive to microprocessor control along a bus 91 for controlling the passage of the drive signals along conductors 73, 75, 77.

Drive switch circuitry 89 will include a plurality of digitally operated analog switches each of which connects a conductor from bus 87 to one of conductors 73, 75, 77. The analog switches are digitally controlled according to logic signals placed on bus 91 by microprocessor 81. Microprocessor 81 also communicates with ramp generator 83 along bus 91 for causing a ramp up waveform to be generated by ramp generator 83 or a ramp down waveform to be generated by ramp generator 83.

In operation, microprocessor 81 generates commands along bus 91 for instructing ramp generator 83 to provide a ramp up output signal to a pretermined level. Microprocessor 81 closes the appropriate analog switch of drive switch circuitry 89 so as to pass the ramp generator signal along conductor 73 and ramp up the cassette spool to a predetermined spool speed. Microprocessor 81 activates the appropriate analog switches for passing signals onto conductor 75 and 77 for driving drive element 31 and supply reel 11 as a function of the changing length of tape as respectively monitored by tape length sensors 43, 41. As described in the above referenced application, Ser. No. 199,923, other drive signals may be generated by signal generator 85 and fed along conductors 73, 75, 77. As will be understood either motor 57, 53, 59 may be driven by a predetermined signal with the remaining other two motors being driven according to signals developed as a function of the output signals of tape length sensors 41, 43.

It should be understood, of course, that the foregoing disclosure relates to preferred embodiments of the invention and that modifications or alterations may be made in such embodiments without departing from the spirit or scope of the invention as set forth in the appended claims.

What is claimed is:

1. A method of loading magnetic tape from a supply spool onto a cassette spool of an empty tape cassette, said method comprising the steps of:
   turning the cassette spool at a predetermined speed, winding the magnetic tape into the cassette;
   providing a first level of tension to the cassette side of the tape moving into the cassette;
   turning the supply spool at a preselected speed, paying out the tape from the supply spool; and
   providing a second level of tension, higher than said first level of tension, to the supply spool side of tape being paid out from the supply spool.

2. A method according to claim 1 and further including the step of regulating the flow of tape between said cassette side of the tape and said spool side of the tape.

3. A method according to claim 2 wherein said step of providing a first level of tension includes vacuum sucking the tape within a first vacuum columnar space to provide said first level of tension; and wherein said step of providing a second level of tension includes vacuum sucking the tape within a second vacuum columnar space to provide said second level of tension.

4. A method according to claim 3 wherein said step of regulating includes moving the tape between said first and said second vacuum columnar spaces.

5. A method according to claim 4 and further including the step of monitoring the length of tape within said first vacuum columnar space.

6. A method according to claim 5 wherein said step of moving includes controlling the rate of movement of the tape between said first and said second vacuum columnar spaces according to the length of tape within said first columnar space.

7. A method according to claim 6 and further including the step of monitoring the length of tape within said second vacuum columnar space.

8. A method according to claim 7 wherein said step of turning the supply spool includes controlling the rate of turning of the supply spool according to the length of tape within said second columnar space.

9. A method according to claim 8 and further including the steps of: generating a ramp waveform signal; and controlling the turning of the cassette spool according to said ramp waveform signal.

10. A tape cassette loader in which two different controlled tensions are provided to a magnetic tape moving from a supply spool to a cassette spool of a tape cassette at a greatly varying speed, said loader comprising:
   a supply spool for providing a supply of magnetic tape;
   a cassette spool for receiving the magnetic tape;
   first tension means for receiving the magnetic tape from said supply spool and providing a first tension to said tape, said first tension means containing a length of the tape in order to maintain said first tension;
   first sensor means for monitoring the length of tape contained by said first tension means;
   second tension means for receiving the tape from said first tension means prior to take up by said cassette spool and providing a second tension to the tape, said second tension means containing a length of the tape in order to maintain said second tension;
   second sensor means for monitoring the length of the tape contained by said second tension means;
   tape moving means interposing said first and said second tension means for moving the tape from said first tension means to said second tension means; and
   control means for driving said tape moving means, said supply spool and said cassette spool, said control means being responsive to said first and said second sensor means for controlling the speed at which the tape is moved by said tape moving means and controlling the speed of said supply spool, whereby said first and said second tensions are maintained during movement of the tape from said supply spool to said cassette spool.

11. A tape cassette loader according to claim 10 wherein said first tension means includes a first vacuum column for applying said first tension to the tape; and wherein said second tension means includes a second vacuum column for applying said second tension to the tape.

12. A tape cassette loader according to claim 11 wherein said first sensor means effectively monitors the length of the loop of tape within said first vacuum column; and wherein said second sensor means effectively monitors the length of the loop of tape within said second vacuum column.

13. A tape cassette loader according to claim 12 wherein said tape moving means includes a motor driven roller for moving tape from said first vacuum column to said second vacuum column.

14. A tape cassette loader according to claim 13 wherein said control means includes a ramp generator for generating a ramp waveform signal, said control means driving said cassette spool in accordance with said ramp waveform signal.

* * * * *